United States Patent [19]

Ono

[11] Patent Number: 4,541,580

[45] Date of Patent: * Sep. 17, 1985

[54] AUTOMATIC LOCKING RETRACTOR

[75] Inventor: Katsuyasu Ono, Fujisawa, Japan

[73] Assignee: NSK-Warner K.K., Japan

[*] Notice: The portion of the term of this patent subsequent to Feb. 12, 2002 has been disclaimed.

[21] Appl. No.: 550,579

[22] Filed: Nov. 10, 1983

[30] Foreign Application Priority Data

Dec. 1, 1982 [JP] Japan .................. 57-182185[U]

[51] Int. Cl.⁴ .................. A62B 35/00; B65H 75/48
[52] U.S. Cl. ............................. 242/107.4 D
[58] Field of Search .............. 242/107.4 R–107.4 E; 280/806–808; 297/474–480

[56] References Cited

U.S. PATENT DOCUMENTS

| 3,174,704 | 3/1965 | Replogle | 242/107.4 D |
| 3,598,336 | 8/1971 | Frost | 242/107.4 D |
| 3,809,332 | 5/1974 | Hayashi | 242/107.4 D |
| 3,945,586 | 3/1976 | Higbee et al. | 242/107.4 D |

Primary Examiner—John M. Jillions
Attorney, Agent, or Firm—Cantor and Lessler

[57] ABSTRACT

Disclosed herein is an automatic locking retractor suitable for use in vehicle seat belt. The retractor is constructed of a take-up spindle, a cog wheel mounted integrally with the spindle, a latch gear integrally rotatable with the cog wheel, a lock lever normally kept in engagement with the cog wheel, a control member and sensor means. The control member is normally biased to a position where it is engageable with the latch gear. The control member can assume a first and second working positions when the take-up spindle is rotated respectively in the pulling-out and winding directions of the webbing. In the first and second working positions, the control member is in contact with the path of rotation of circumference of the latch gear. The control member holds the lock lever in a position where the lock lever permits free rotation of the cog wheel when the webbing has been pulled out and the control member has moved toward the first working position. The control member, on the other hand, permits the lock lever to engage with the cog wheel when the control member has moved toward the second working position. The retractor features fail-free control of the movement of the lock lever owing to the provision of the control member.

12 Claims, 7 Drawing Figures

AUTOMATIC LOCKING RETRACTOR

BACKGROUND OF THE INVENTION

(1) Field of the Invention

This invention relates to an automatic locking retractor suitable for use in a vehicle seat belt, and more particularly to such a retractor which produce little unpleasant noise when winding the webbing into the retractor.

(2) Description of the Prior Art

In a vehicle seat belt equipped with a so-called automatic locking retractor, the webbing wound up on the retractor is pulled out and worn by the occupant. The webbing is then allowed to be wound back on the retractor over any extra length thereof. When the occupant tries to pull out the webbing again, the webbing is restrained from any further release. A variety of different types of such automatic locking retractors has been proposed and actually used to date (see, for example, U.S. Pat. No. 3,412,952 issued Nov. 26, 1968 to Wohlert et al, U.S. Pat. No. 3,667,698 issued June 6, 1972 to Fisher, U.S. Pat. No. 3,944,163 issued Mar. 16, 1976 to Yoshio Hayashi et al, etc.).

Many of such prior art automatic locking retractors are of such a type that they are each constructed of a pair of cog wheels integral with a take-up spindle, on which a webbing is releasably wound up, and a lock lever normally urged or biased in a direction capable of engaging with the cog wheels and controlled by a cam plate which is frictionally cooperated with the rotation of the take-up spindle.

In the above conventional structure, the relationship between the biasing force applied to the lock lever and the frictionally-produced turning force of the cam plate is extremely delicate. Therefore, it is necessary to pay close attention to the quality control of the spring means which are employed to produce the biasing force and turning force.

SUMMARY OF THE INVENTION

With the foregoing in view, it is an object of this invention to provide an automatic locking retractor which permits fail-free control of the movement of the lock lever by using a control member of a novel construction that does not frictionally cooperate with the rotation of the take-up spindle.

In one aspect of this invention, there is thus provided an automatic locking retractor which comprises:

a casing;

a take-up spindle rotatably supported on the casing and urged in the winding direction of a webbing;

a cog wheel mounted integrally on the take-up spindle;

a latch gear integrally rotatable together with the cog wheel;

a lock lever displaceable between a first position where the lock lever is in engagement with the cog wheel and a second position where the lock lever permits free rotation of the cog wheel, said lock lever being biased toward the first position;

a control member normally biased to a position, where the control member is engageable with the latch gear, and capable of assuming a first working position where the control member is brought into contact with the path of rotation of the circumference of the latch gear by a rotation of the take-up spindle in the pulling-out direction of the webbing and a second working position where the control member is brought into contact with the path of rotation of the circumference of the latch gear by a rotation of the take-up spindle in the winding direction of the webbing; and sensor means provided integrally with the lock lever and adapted to hold the lock lever in the second position when the webbing has been wound up over at least a predetermined length;

wherein the control member has a control portion capable of holding the lock lever in the second position, when the webbing wound up on the take-up spindle over at least the predetermined length has been pulled out and the control member has moved toward the first working position, and permitting free movement of the lock lever toward the first position when the control member has moved toward the second working position.

The automatic locking retractor of this invention has an advantageous effect that the lock lever can be controlled without failure, because it incorporates such a construction that the movement of the lock lever is, as described above, controlled by a control member that is normally biased to a position where it is engageable with the latch gear rotating integrally with the cog wheels.

The above and other objects, features and advantages of the present invention will become more apparent from the following description and the appended claims, taken in conjunction with the accompanying drawings.

DETAILED DESCRIPTION OF THE INVENTION AND PREFERRED EMBODIMENT

Figure 1:
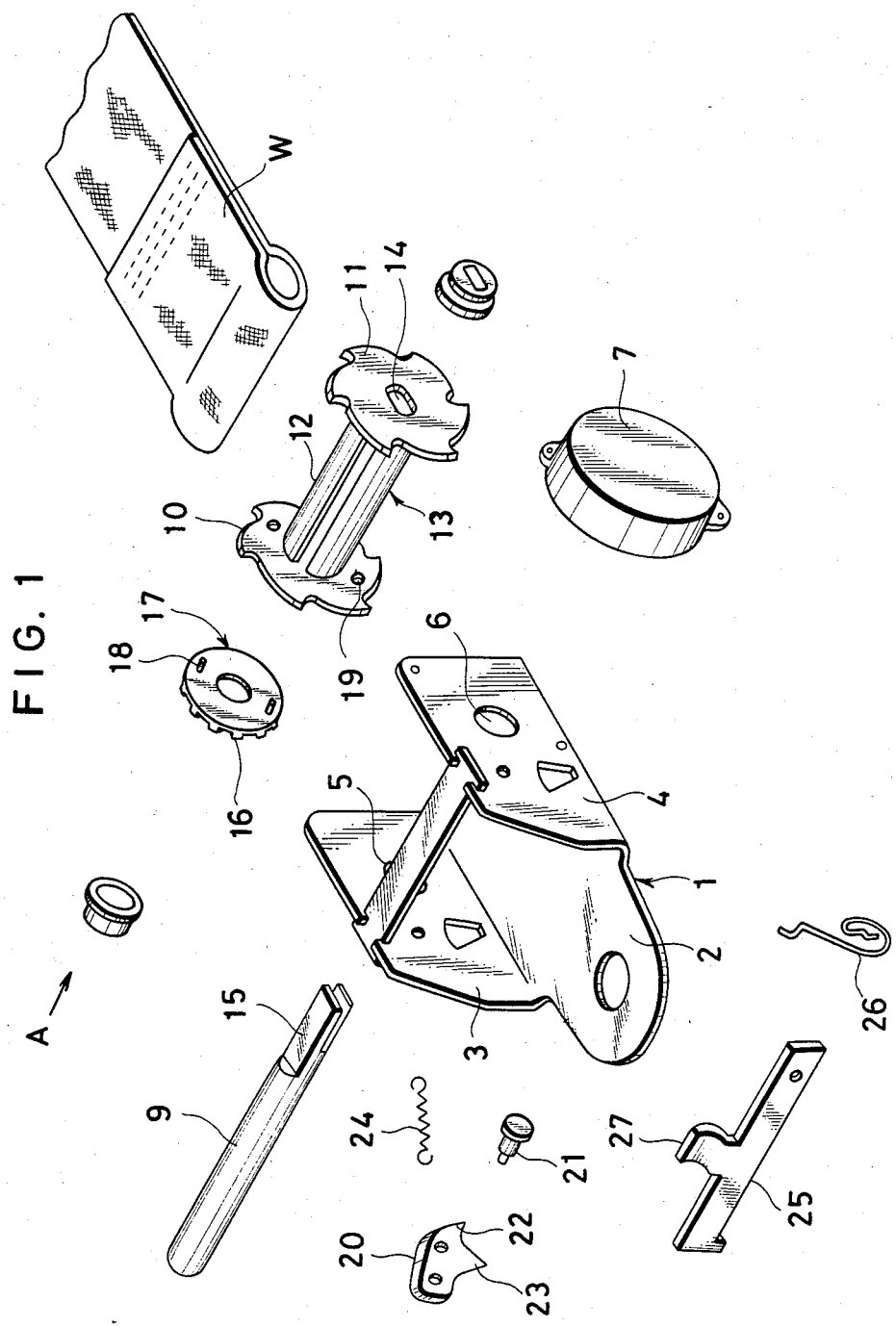
FIG. 1 is an exploded perspective view of an automatic locking retractor according to one embodiment of this invention.
Figure 2:
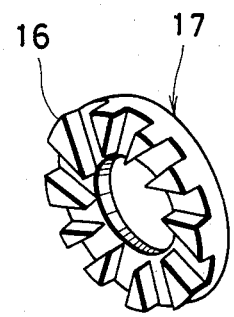
FIG. 2 is a perspective view of the latch gear, seen in the direction A in FIG. 1.
Figure 3:
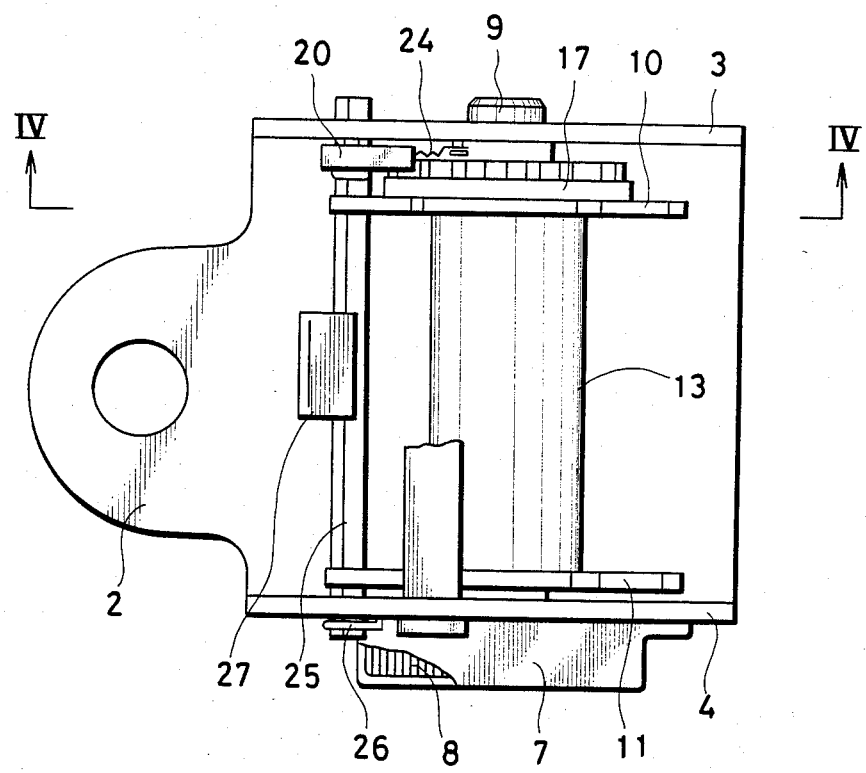
FIG. 3 is a plan view of the automatic locking retractor of FIG. 1.

Referring first to FIGS. 1 to 4, a casing 1 has a base 2 and a pair of side plates 3,4 extending substantially upright from the base 2. Spindle holes 5,6 are bored through the side plates 3,4 at substantially central parts thereof. In the spindle holes 5,6, is rotatably supported a take-up spindle 9 which is applied with a rotary force normally urged in the webbing-winding direction (namely, in the clockwise direction in FIG. 1) by means of a take-up spring 8 housed in a spring cover 7. On the take-up spindle 9, there are mounted a pair of cog wheels 10,11 each having teeth formed with a constant interval on the outer circumference thereof and a reel 13 having a cylindrical portion 12 which connects the cog wheels 10,11 to each other. The reel 13 is rotated integrally with the take-up spindle 9 because a fitting hole 14 of the cog wheel 11 is press-fit over a bevelled end portion 15 of the take-up spindle 9. One end of the webbing W is fastened between the take-up spindle 9 and the reel 13 by a method known per se in the art.

Outside the other cog wheel, i.e., the cog wheel 10, there is provided a latch gear 17 which contains a number of lands 16 (see, FIG. 2) on the side facing the side plate 3 and is preferably made of a resin. The lands 16 define a plurality of first interlocking faces 31 directed in the pulling-out direction of the webbing and a plurality of second interlocking faces 32 directed in the winding direction of the webbing. The latch gear 17 is rotatable integrally with the cog wheel 10 because its pins 18 are fit in bores 19 formed through the cog wheel 10.

In the proximity of the latch gear 17, a control lever 20 is provided as a control member pivotal about a pin 21 fixedly provided on the side plate 3. The control lever 20 has a first arm 22 which is engageable with the lands 16 of the latch gear 17 and a second arm 23 which is engageable with a lock lever 25. The lock lever 25 will be described later in this specification. The control lever 20 is normally biased by a spring 24 provided with the side plate 3 in such a way that the first arm 22 assumes a position where it is engageable with any one of the lands 16 of the latch gear 17, namely, a position where the first arm 22 is located inside the path of rotation of the circumference of the latch gear 17.

The lock lever 25 extends between the side plates 3 and 4 of the casing 1 and in front of the reel 13 in such a way that the lock lever 25 is displaceable between a first position, where it is kept in engagement with the cog wheels 10,11 to restrain the cog wheels 10,11 from rotation, and a second position where the lock lever 25 permits free rotation of the cog wheels 10,11. The lock lever 25 is normally urged in the clockwise direction, in other words, toward the first position where it engages with the cog wheels 10,11, owing to the biasing force of a lever spring 26. A sensing piece 27 is provided integrally with the lock lever 25, as means for sensing the wound-up length of the webbing W.

Figure 5:
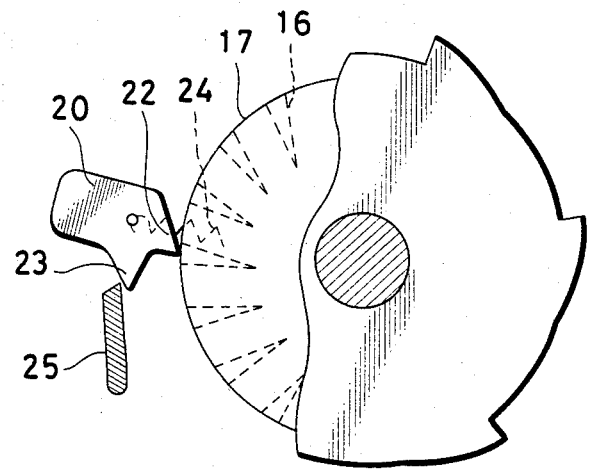
FIGS. 5 through 7 are partially cut-away, simplified, cross-sectional views of the automatic locking retractor of FIG. 1, illustrating the operation of the retractor in three different stages respectively.
Figure 6:
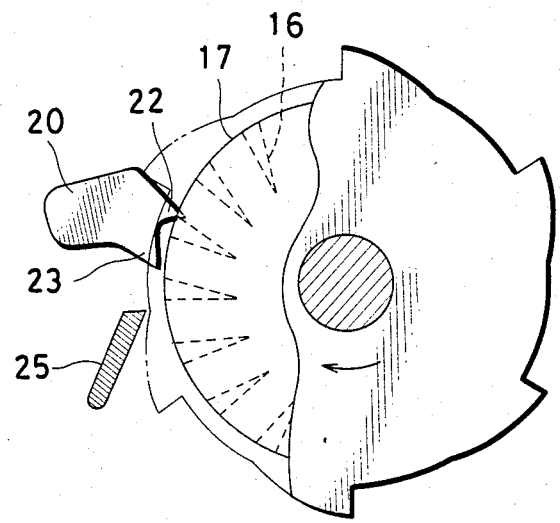
Figure 7:
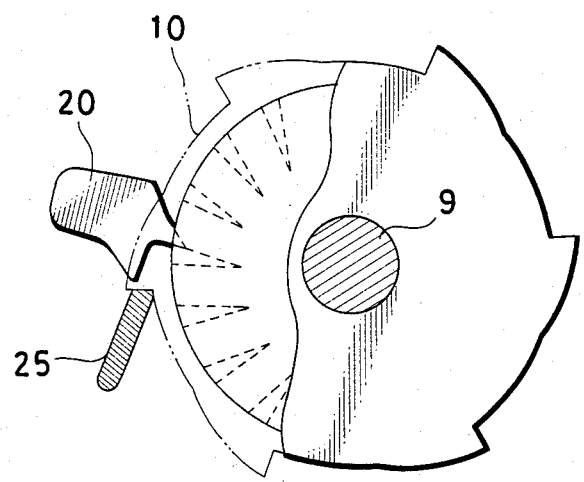

Next, operation of the automatic locking retractor according to the above embodiment will be described with reference to FIGS. 4 through 7. In FIGS. 5 through 7, the casing is omitted.

Figure 4:
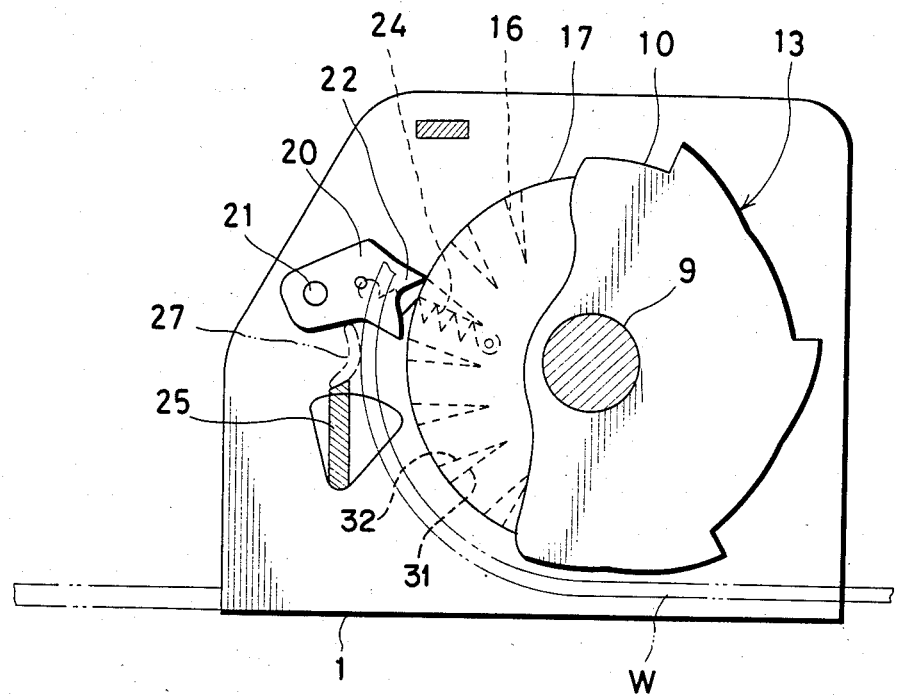
FIG. 4 is a cross-sectional view of the automatic locking retractor, taken along line IV—IV of FIG. 3.

In FIG. 4, the webbing W is in a wound-up state. Here, the sensing piece 27 has been pushed outwards by the thus-wound webbing W and the lock lever 25, which is integral with the sensing piece 27, is thus held in the non-engagement position where the lock lever 25 is not engageable with the cog wheels 10,11. The control lever 20 whose first arm 22 is in an engageable state with the latch gear 17 turns counterclockwise about the pivot 21 when the latch gear 17, which rotates integrally with the take-up spindle 9, turns in the webbing-winding direction (i.e., clockwise direction in the drawing). Thus, the control lever 20 is pushed to either the second working position where it is kept in contact with the path of rotation of the circumference of the latch gear 17 as shown in FIG. 4 or a position where the first arm 22 is located between two mutually-adjacent lands 16 of the latch gear 17 and the control lever 20 has been turned slightly in the clockwise direction from the position illustrated in FIG. 4.

When the occupant in the vehicle seat pulls out the webbing W to wear it, the reel 13 which is integral with the take-up spindle 9 and the latch gear 17 which is in turn integral with the reel 13 are rotated in the counterclockwise direction against the biasing force of the take-up spring 8. By the turning motion of the take-up spindle 9 in the pulling-out direction of the webbing W, the control lever 20 which is normally biased owing to the provision of the spring 24 to the position where it is engageable with the latch gear 17 is turned in the clockwise direction about the pivot 21 because the turning force of the latch gear 17 is transmitted to the control lever 20 by way of one of the first interlocking faces 31. Thus, the control lever 20 moves to the first working position where the control lever 20 is kept in contact with the path of rotation of the circumference of the latch gear 17. This state is shown in FIG. 5.

When the webbing W is pulled out further from the state shown in FIG. 5 and the latch gear 17 is hence turned counterclockwise, the first arm 22 of the control lever 20 is disengaged from the land 16 of the latch gear 17 and the control lever 20 is thus turned slightly in the counterclockwise direction by the biasing force of the spring 24. However, this turning motion of the control lever 20 is allowed to continue only until the first arm 22 is brought into abutment with the adjacent land 16. When the latch gear 17 turns further, the control lever 20 is then turned clockwise to the first working position while the abutment of the first arm 22 and the land 16 is maintained. The control lever 20 undergoes the above movement repeatedly as long as the webbing W is pulled out.

At this time, the thickness of the webbing W on the reel 13 becomes thinner as the webbing is pulled out. Reflecting the decreasing thickness of the webbing, the sensing piece 27 which is kept in contact with the webbing is turned clockwise by virtue of the biasing force of the lever spring 26. Accordingly, the lock lever 25 is also turned clockwise because it is integral with the sensing piece 27. The lock lever 25 cannot however turn beyond a certain limit because, preceding the turning movement of the lock lever 25, the control lever 20 has already moved to a position turned clockwise from the previous position and the lock lever 25 has thus been brought into abutment with the second arm 23 of the control lever 20. Consequently, the lock lever 25 is continuously held in a position where it is out of engagement with the cog wheels 10,11. Therefore, it is still possible to pull out the webbing W and the control lever 20 and the lock lever 25, which is kept in engagement with the control lever 20, repeatedly undergo such slight turning movements as described above and the lock lever 25 is held continuously at the position illustrated in FIG. 5 until the pulling-out motion of the webbing is stopped.

As soon as the occupant has worn the webbing following the stop of the pulling-out motion of the webbing W, the webbing is slightly wound back over any extra length. This causes the cog wheels 10,11 to rotate in the clockwise direction, thereby rotating the latch gear 17 clockwise since the latch gear 17 rotates together with the the cog wheels 10,11. Owing to this rotation of the latch gear 17, the control lever 20 which is kept in the position where it is engageable with the latch gear 17 is turned counterclockwise owing to its engagement with one of the second interlocking faces 32. Thus, the control lever 20 moves toward the second working position. This state is illustrated in FIG. 6.

At this stage, the lock lever 25 is released from the engagement with the second arm 23 of the control lever 20. The lock lever 25 is thus allowed to turn clockwise owing to the biasing force of the lever spring 26 and hence moves toward the first position where the lock lever 25 is brought into engagement with the cog wheels 10,11.

If the webbing W is again applied with a pulling force in the state shown in FIG. 6, for example, in the event of an emergency such as vehicle collision or the like, the lock lever 25 which has been held in the abovementioned position is brought into engagement with the teeth of the cog wheels 10,11. This state is shown in FIG. 7. Accordingly, the cog wheels 10,11, in other words, the take-up spindle 9 is restrained from any further rotation and the pulling-out of the webbing W is restrained, thereby protecting the occupant safely.

When the occupant takes off the webbing W, the webbing W is wound back by the biasing force of the take-up spring 8. The retractor is thus brought first into the state shown in FIG. 6 and then into the state illustrated in FIG. 4.

It should be borne in mind that the above embodiment has been given by way of example only. Needless to say, a variety of designing modifications and changes may be made thereto so long as such modifications and changes do not depart from the principal feature of this invention. It may for example be contemplated:

(1) to employ only one cog wheel instead of the two cog wheels 10,11;

(2) to provide the cog wheels and control lever outside the side plates of the casing; or (3) to use a control member supported slidably on the casing instead of the control lever supported pivotally on the casing.

Having now fully described the invention, it will be apparent to one of ordinary skill in the art that many changes and modifications can be made thereto without departing from the spirit or scope of the invention as set forth herein.

What is claimed is:

1. An automatic locking retractor comprising:
   a casing;
   a take-up spindle rotatably supported on the casing and urged in the winding direction of a webbing;
   a cog wheel mounted integrally on the take-up spindle;
   a latch gear fixed to, and integrally rotatable with, the cog wheel;
   a lock lever displaceable between a first position where the lock lever is in engagement with the cog wheel and a second position where the lock lever permits free rotation of the cog wheel, said lock lever being biased toward the first position;
   a control member normally biased to a position, where the control member is engageable with the latch gear, and capable of assuming a first working position where the control member is brought into contact with the path of rotation of the circumference of the latch gear by a rotation of the take-up spindle in the pulling-out direction of the webbing and a second working position where the control member is brought into contact with the path of rotation of the circumference of the latch gear by a rotation of the take-up spindle in the winding direction of the webbing, and
   sensor means provided integrally with the lock lever and adapted to hold the lock lever in the second position when the webbing has been wound up over at least a predetermined length;
   wherein the control member has a first arm and a second arm engageable with the lock lever, the second arm serving as a control portion capable of holding the lock lever in the second position, when the webbing wound up on the take-up spindle over at least the predetermined length has been pulled out and the control member has moved toward the first working position, and permitting free movement of the lock lever toward the first position when the control member has moved toward the second working position.

2. The automatic locking retractor as claimed in claim 1, wherein the control member is pivotally supported on the casing.

3. The automatic locking retractor as claimed in claim 2, wherein the pivot axis of the control member is parallel to the axis of rotation of the latch gear.

4. The automatic locking retractor as claimed in claim 1, wherein said latch gear comprises a circular base portion with an axial mounting hole and a plurality of lands on one side thereof extending radially from the mounting hole, said lands being generally triangular.

5. The automatic locking retractor as claimed in claim 4, wherein the opposed faces of each pair of adjacent lands are essentially parallel.

6. The automatic locking retractor as claimed in claim 1, wherein said first arm of said control member is engageable with the latch gear.

7. An automatic locking retractor comprising:
   a casing;
   a take-up spindle rotatably supported on the casing and urged in the winding direction of a webbing;
   a cog wheel mounted integrally on the take-up spindle;
   a latch gear integrally rotatable with the take-up spindle and having a plurality of first interlocking faces directed in the pulling-out direction of the webbing and a plurality of second interlocking faces directed in the winding direction of the webbing;
   a lock lever displaceable between a first position where the lock lever is in engagement with the cog wheel and a second position where the lock lever permits free rotation of the cog wheel, said lock lever being biased toward the first position;
   a control member held in a position, where the control member is normally engageable with the latch gear, so that when the webbing is pulled out after the webbing has been wound up over at least a predetermined length, the control member is brought into engagement with either one of the first interlocking faces and is then displaced in a first direction to hold the lock lever in the second position and any subsequent winding of the webbing causes the control member to engage with either one of the second interlocking faces, whereby displacing the control member in a second direction so as to permit displacement of the lock lever toward the first position; and
   sensor means provided integrally with the lock lever and adapted to hold the lock lever in the second position when the webbing has been wound up over at least a predetermined length.

8. The automatic locking retractor as claimed in claim 7, wherein the control member is pivotally supported on the casing.

9. The automatic locking retractor as claimed in claim 7, wherein the control member has a first arm engageable with the latch gear and a second arm engageable with the lock lever.

10. The automatic locking retractor as claimed in claim 7, wherein the first and second interlocking faces are formed in one of the side walls of the latch gear.

11. The automatic locking retractor as claimed in claim 7, wherein the latch gear is integrally fixed to the cog wheel.

12. The automatic locking retractor as claimed in claim 10, wherein said latch gear comprises a circular base portion with an axial mounting hole and a plurality of lands on one side thereof extending radially from the mounting hole, said lands being generally triangular wherein said first and second interlocking faces being the opposed axial faces of said lands, and wherein the opposed faces of each pair of adjacent lands are essentially parallel.

* * * * *